(12) United States Patent
Arndt et al.

(10) Patent No.: US 7,283,473 B2
(45) Date of Patent: Oct. 16, 2007

(54) APPARATUS, SYSTEM AND METHOD FOR PROVIDING MULTIPLE LOGICAL CHANNEL ADAPTERS WITHIN A SINGLE PHYSICAL CHANNEL ADAPTER IN A SYSTEM AREA NETWORK

(75) Inventors: Richard Louis Arndt, Austin, TX (US); Bruce Leroy Beukema, Hayfield, MN (US); David F. Craddock, New Paltz, NY (US); Ronald Edward Fuhs, Rochester, MN (US); Thomas Anthony Gregg, Highland, NY (US); Allan Samuel Meritt, Poughkeepsie, NY (US); Calvin Charles Paynton, Byron, MN (US); Steven L. Rogers, Rochester, MN (US); Donald William Schmidt, Stone Ridge, NY (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 10/411,448

(22) Filed: Apr. 10, 2003

(65) Prior Publication Data

US 2004/0202189 A1    Oct. 14, 2004

(51) Int. Cl.
*G01R 31/08*    (2006.01)

(52) U.S. Cl. ............... 370/231; 370/237; 709/202
(58) Field of Classification Search .............. None
See application file for complete search history.

(56) References Cited

U.S. PATENT DOCUMENTS

| | | | |
|---|---|---|---|
| 2002/0085493 A1* | 7/2002 | Pekkala et al. | 370/235 |
| 2002/0159385 A1* | 10/2002 | Susnow et al. | 370/229 |
| 2002/0191599 A1* | 12/2002 | Parthasarathy et al. | 370/389 |

* cited by examiner

*Primary Examiner*—Chau Nguyen
*Assistant Examiner*—Jung Park
(74) *Attorney, Agent, or Firm*—Duke W. Yee; Casimer K. Salys; Theodore D. Fay, III

(57) ABSTRACT

An apparatus, system and method for providing multiple logical partitions in a system area network are provided. Logical partitioning support is provided for host channel adapters which allows multiple operating systems to share the resources of a single physical host channel adapter (HCA). The apparatus, system and method ensures that each operating system is unaware that the HCA hardware resources are being shared with other operating systems and further guarantees that the individual operating systems are prevented from accessing HCA hardware resources which are associated with other operating systems.

21 Claims, 12 Drawing Sheets

APPARATUS, SYSTEM AND METHOD FOR PROVIDING MULTIPLE LOGICAL CHANNEL ADAPTERS WITHIN A SINGLE PHYSICAL CHANNEL ADAPTER IN A SYSTEM AREA NETWORK

BACKGROUND OF THE INVENTION

1. Technical Field

The present invention is directed to an improved data processing system. More specifically, the present invention provides an apparatus, system and method for providing multiple logical partitions in a system area network.

2. Description of Related Art

In a System Area Network (SAN), such as an InfiniBand (IB) network, the hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN host channel adapter (HCA). These processes also are referred to as "consumers."

The send/receive work queues (WQ) are assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

Thus, with the SAN architecture described above, an Ethernet device driver can communicate with an Ethernet adapter by posting send/receive messages to a Host Channel Adapter (HCA) and retrieve the results of these messages through the HCA's Send and Receive Work Queues. The Ethernet adapter includes a Target Channel Adapter, which is the component that attaches to the SAN. Thus, to attach to a Local Area Network (LAN), such as an Internet Protocol (IP) and Ethernet network, an Ethernet adapter is needed as well as a switch or router that attaches the Ethernet adapter to the IP based LAN.

Often it is beneficial to logically partition the individual components and resources within a system so as to support a plurality of operating system environments. Such logical partitioning allows each operating system, and applications operating within that operating system environment, to view the resources of the system as being dedicated to that operating system environment even though, in actuality, the resources are shared by a plurality of operating system environments. Such logical partitioning allows a system to support multiple different environments and thus, increases the versatility of the system while reducing the cost of maintaining the different environments by sharing of resources.

While logically partitioning is generally known in the art, logical partitioning has not been applied to a system area network, such as the InfiniBand network architecture. Therefore, it would be beneficial to have an apparatus, system and method for implementing logical partitioning in a system area network such as the InfiniBand network.

SUMMARY OF THE INVENTION

The present invention provides an apparatus, system and method for providing multiple logical partitions in a single Channel Adapter within a system area network. In a preferred embodiment, the system area network is an InfiniBand network. The present invention provides logical portioning support for channel adapters to allow multiple operating systems to share the resources of a single physical host channel adapter (HCA) by creating the logical view of separate host channel adapters within a single physical host channel adapter. The present invention ensures that each operating system is unaware that the HCA hardware resources are being shared with other operating systems and further guarantees that the individual operating systems are prevented from accessing HCA hardware resources which are associated with other operating systems.

With the apparatus, system and method of the present invention, the queue pair resources of a host channel adapter (HCA) are logically partitioned through the assignment of a local identifier (LID) and Global Identifier (GID) to the resources by trusted hypervisor software. Resources having the same LID and GID comprise a logical host channel adapter. The address space associated with each queue pair's LIDs and GIDs is only accessible by hypervisor software.

In the InfiniBand architecture, physical ports of a CA must have a unique logical identifier (LID) and global identifier (GID) assigned to them. With the present invention, HCA hardware facilities are provided for specifying LID and GID attributes for each queue pair instead of a single LID and GID for each physical port. In this way, each logical port created by the present invention for a logical partition may have its own unique LID and GID such that each logical partition operates as if it were its own logical host channel adapter.

Each logical host channel adapter may have a plurality of queue pairs assigned to a logical partition which have attributes that are configured to provide access to multiple physical ports. Since each queue pair may send data packets to and receive packets from a plurality of physical ports, each queue pair provides facilities which indicate the physical port to which it is associated.

Each physical port also provides additional facilities which are used to determine whether packets received from an external source are to be routed to a queue pair contained within the HCA. If the packet is to be routed to a queue pair within the HCA, the HCA hardware then checks that the LID and GID which are assigned to the queue pair match the corresponding fields of the inbound packet. The port facilities are also used to check outbound packets to determine whether the destination is another queue pair within the physical CA, in which case the packet is routed to the internal queue pair. If the packet is to be routed to a queue pair within the HCA, the HCA hardware checks that the LID and GID that are assigned to the queue pair match the corresponding fields of the inbound packet. These internally routed packets are also checked to ensure they also meet the destination queue pair's attributes. Both the queue pair facilities and the port facilities are maintained by the hypervisor software and create the logical view that a switch exists between the queue pair and the physical port.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides an apparatus, system and method for providing logical partitioning in a system area network. The preferred embodiments of the present invention will be described in terms of the InfiniBand architecture which is one possible system area network in which the present invention may be used. Therefore, a description of the InfiniBand network will first be provided with regard to FIGS. 1-11.

Figure 1:
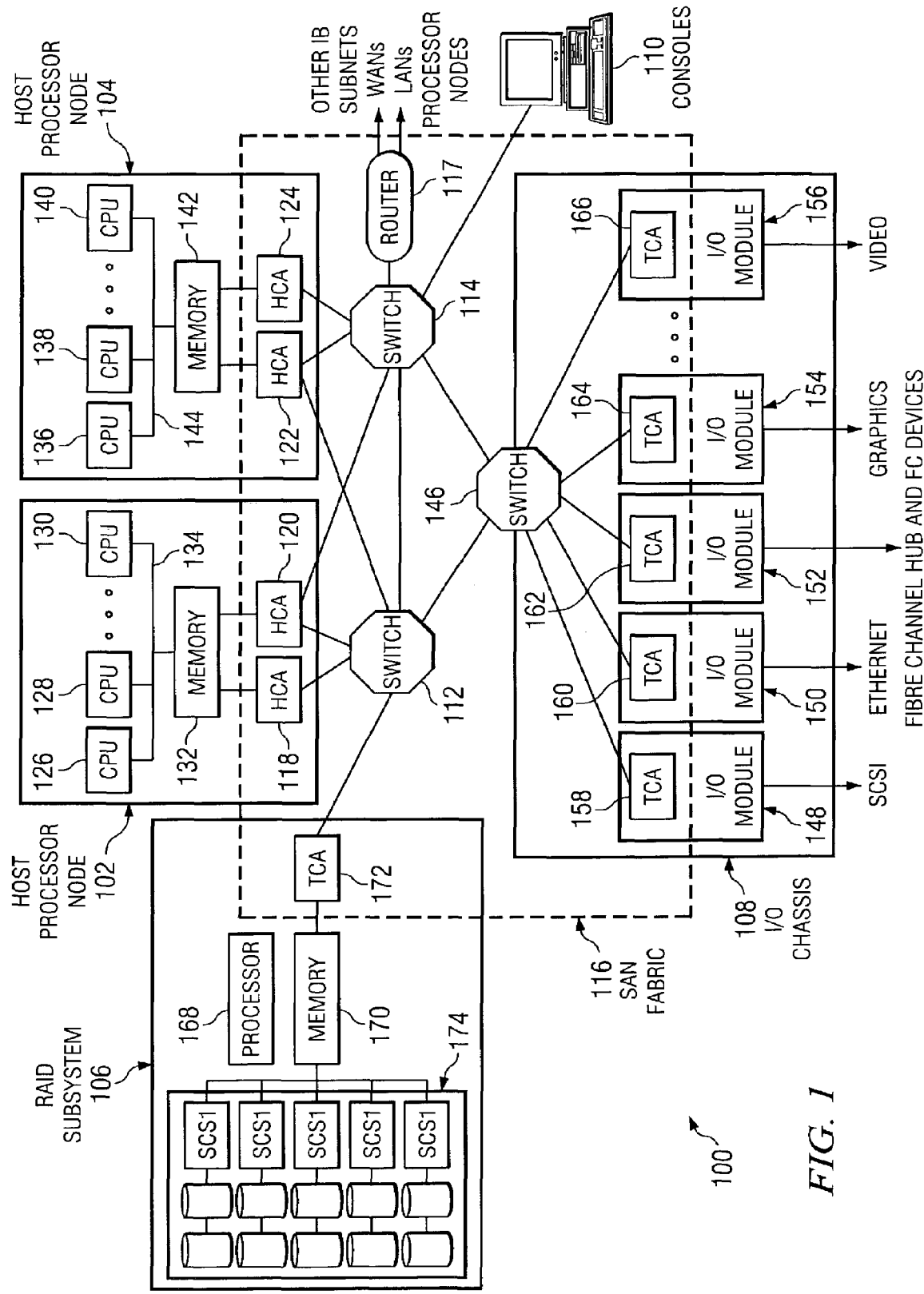
FIG. 1 is a diagram of a distributed computer system is illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols.

In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications. As indicated in FIG. 1, router 116 is coupled to wide area network (WAN) and/or local area network (LAN) connections to other hosts or other routers.

The I/O chassis 108 in FIG. 1 includes an I/O switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes, memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/Q operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
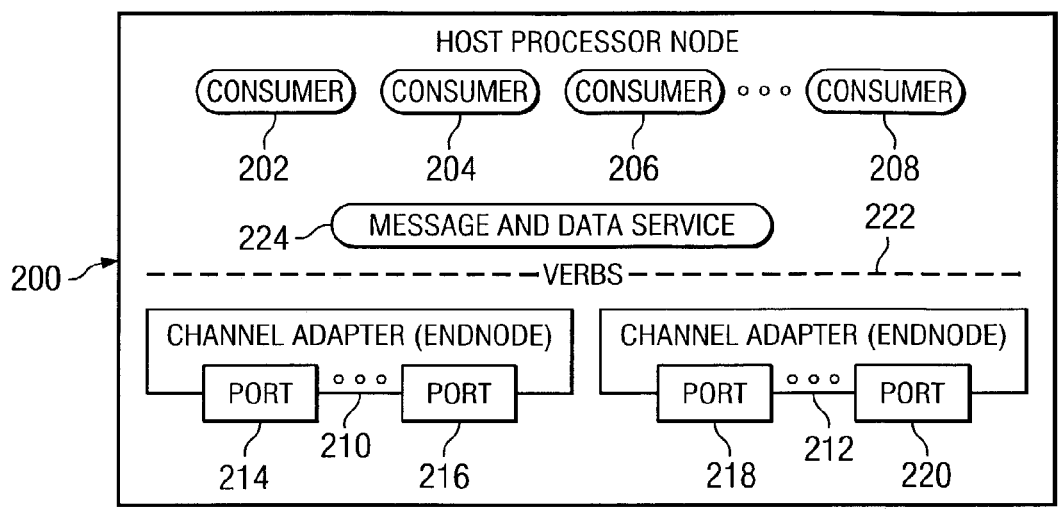
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1.

In this example, host processor node 200 shown in FIG. 2 includes a set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202-208 to process messages and other data.

Figure 3A:
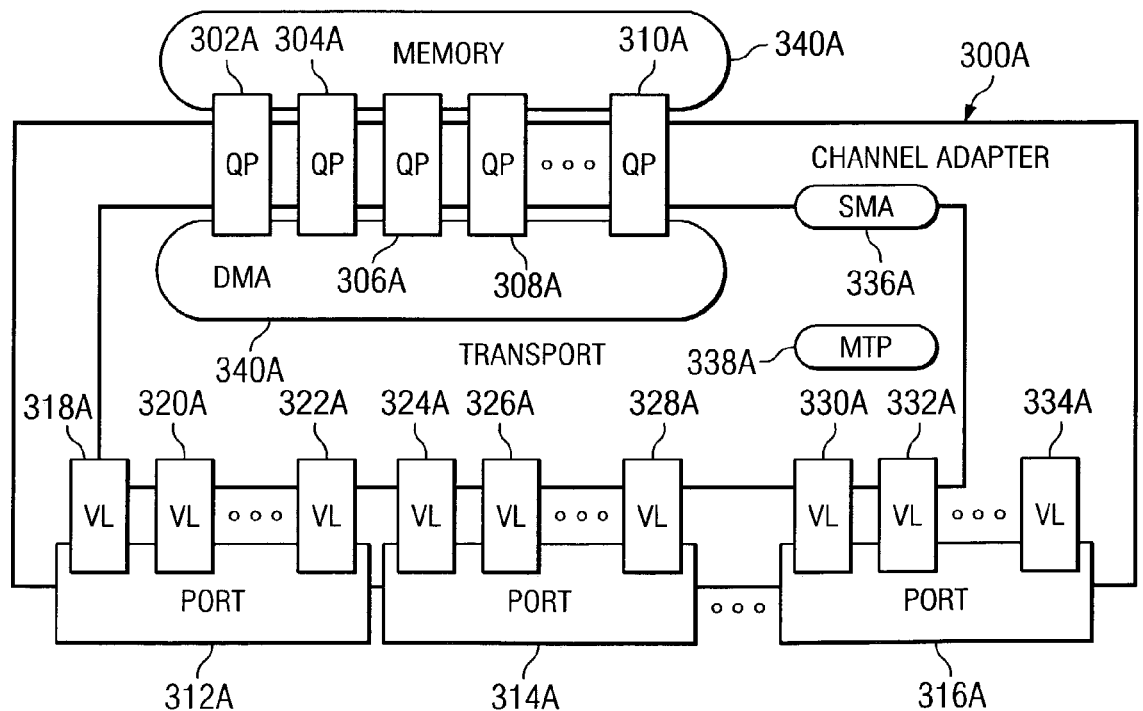
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A-310A, which are used to transfer messages to the host channel adapter ports 312A-316A. Buffering of data to host channel adapter ports 312A-316A is channeled through virtual lanes (VL) 318A-334A where each VL has its own flow control. Subnet manager configures channel adapters with the local addresses for each physical port, i.e., the port's LID.

Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A-310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel and semantic messages. A consumer calls an operating-system specific programming interface, which is herein referred to as verbs, to place work requests (WRs) onto a work queue.

Figure 3B:
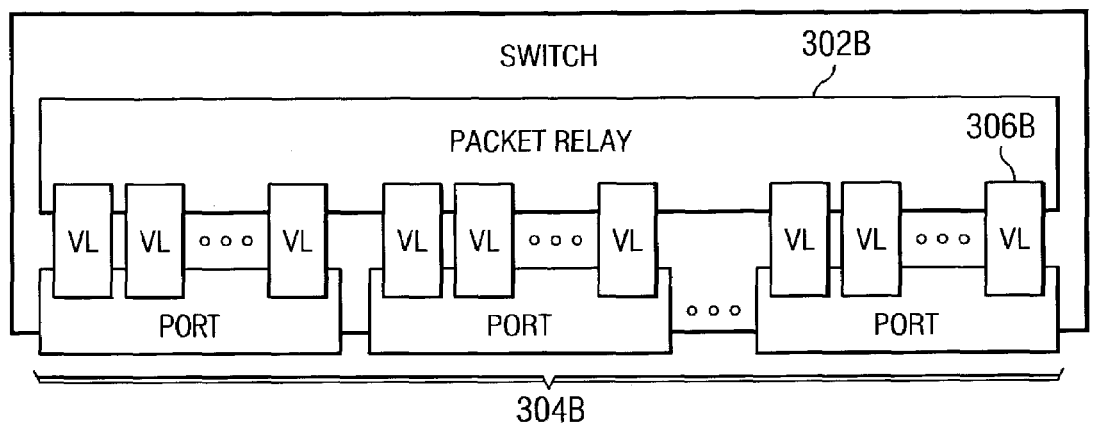
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
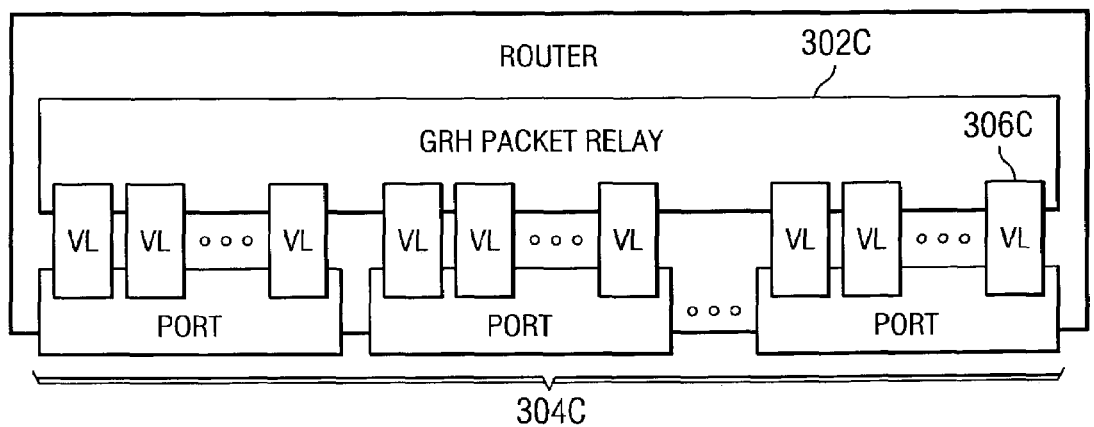
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
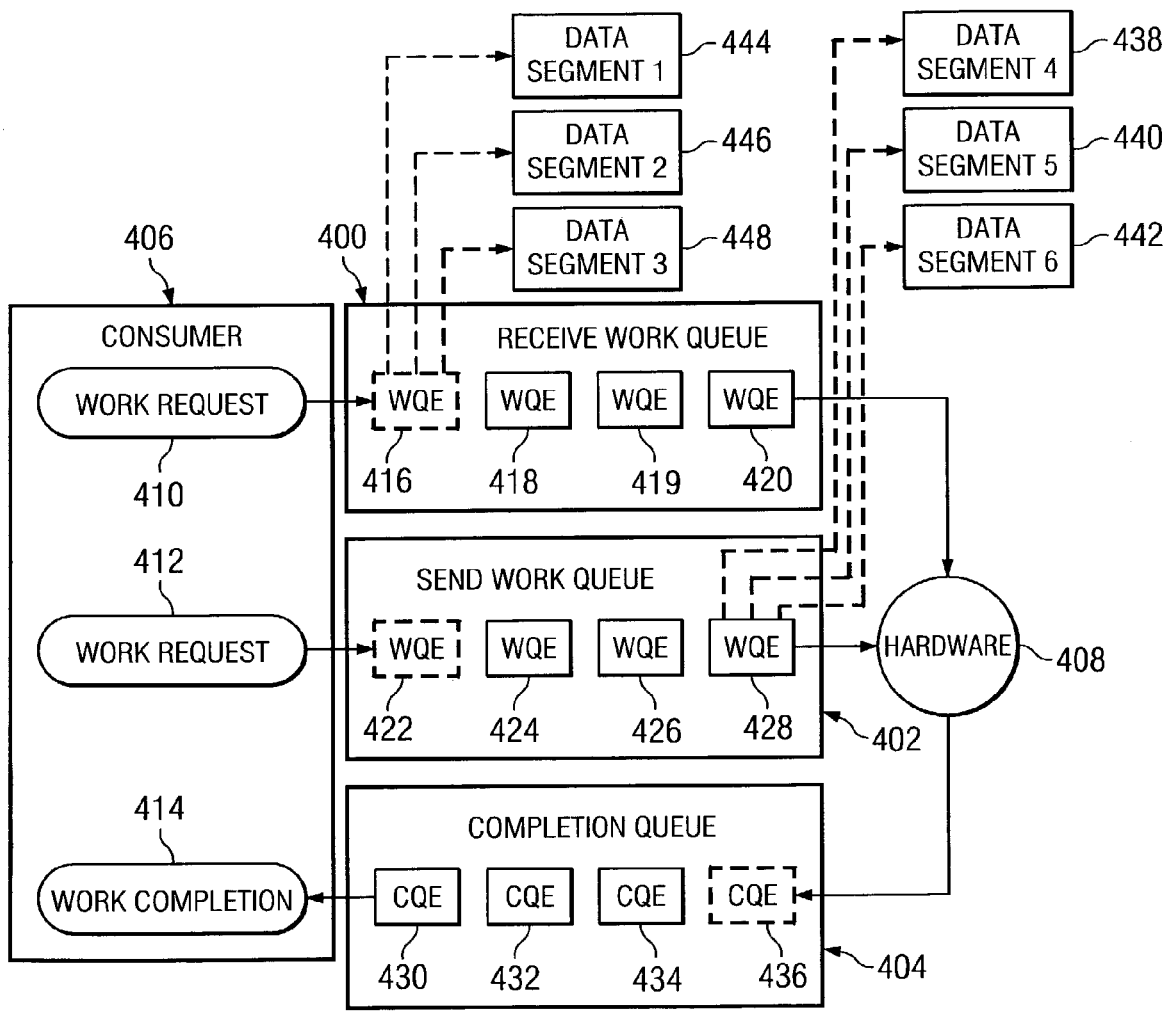
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQES) 416-420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services; reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Figure 5:
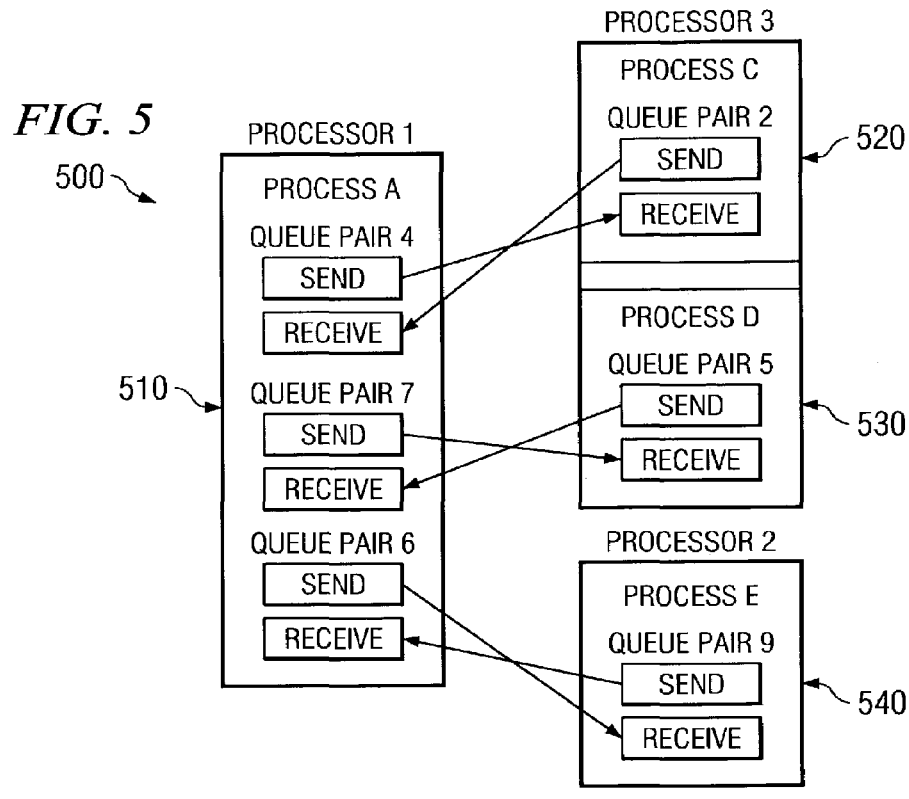
FIG. 5 is a diagram illustrating a portion of a distributed computer system in accordance with a preferred embodiment of the present invention in which a reliable connection service is used.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

Figure 6:
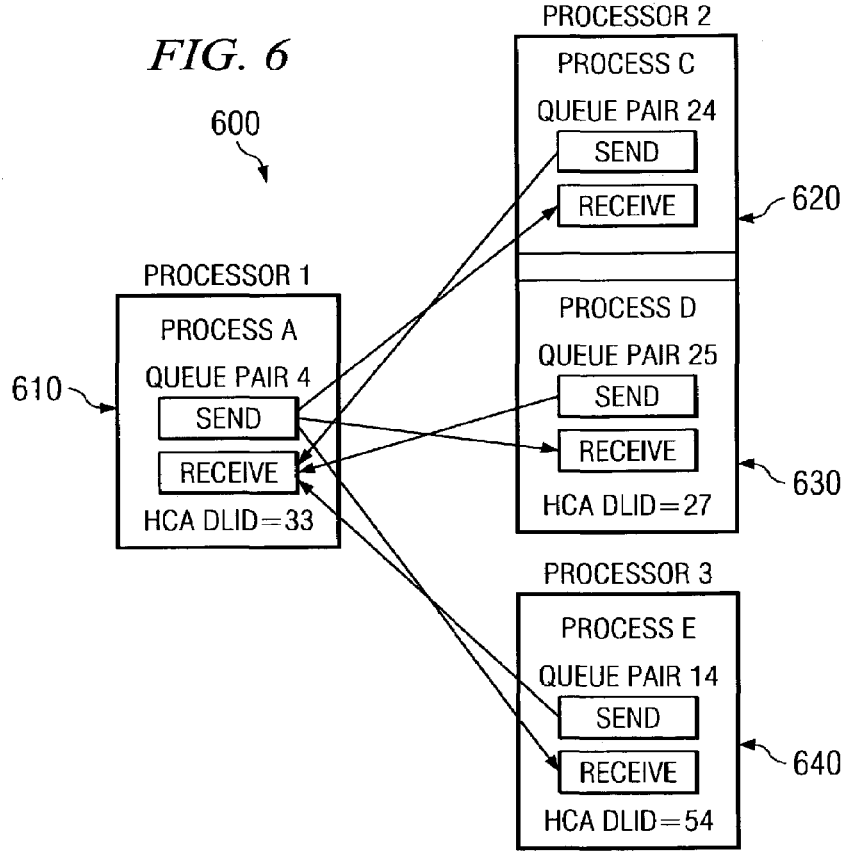
FIG. 6 is a diagram illustrating a portion of a distributed computer system in accordance with a preferred embodiment of the present invention in which reliable datagram service connections are used.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 7:
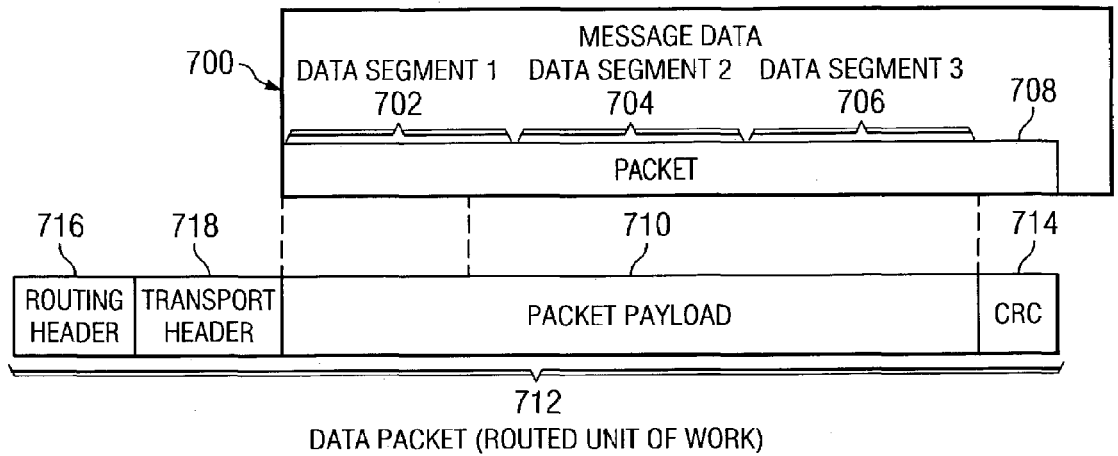
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figure 8:
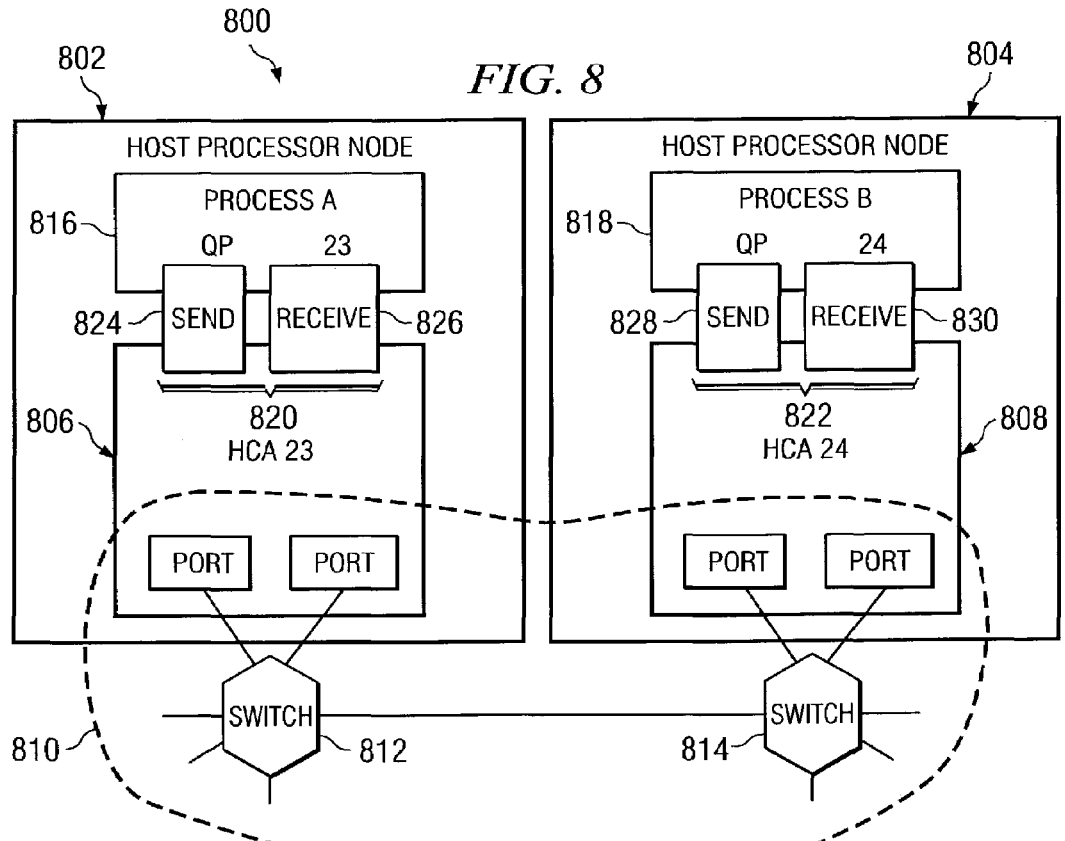
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue.

Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
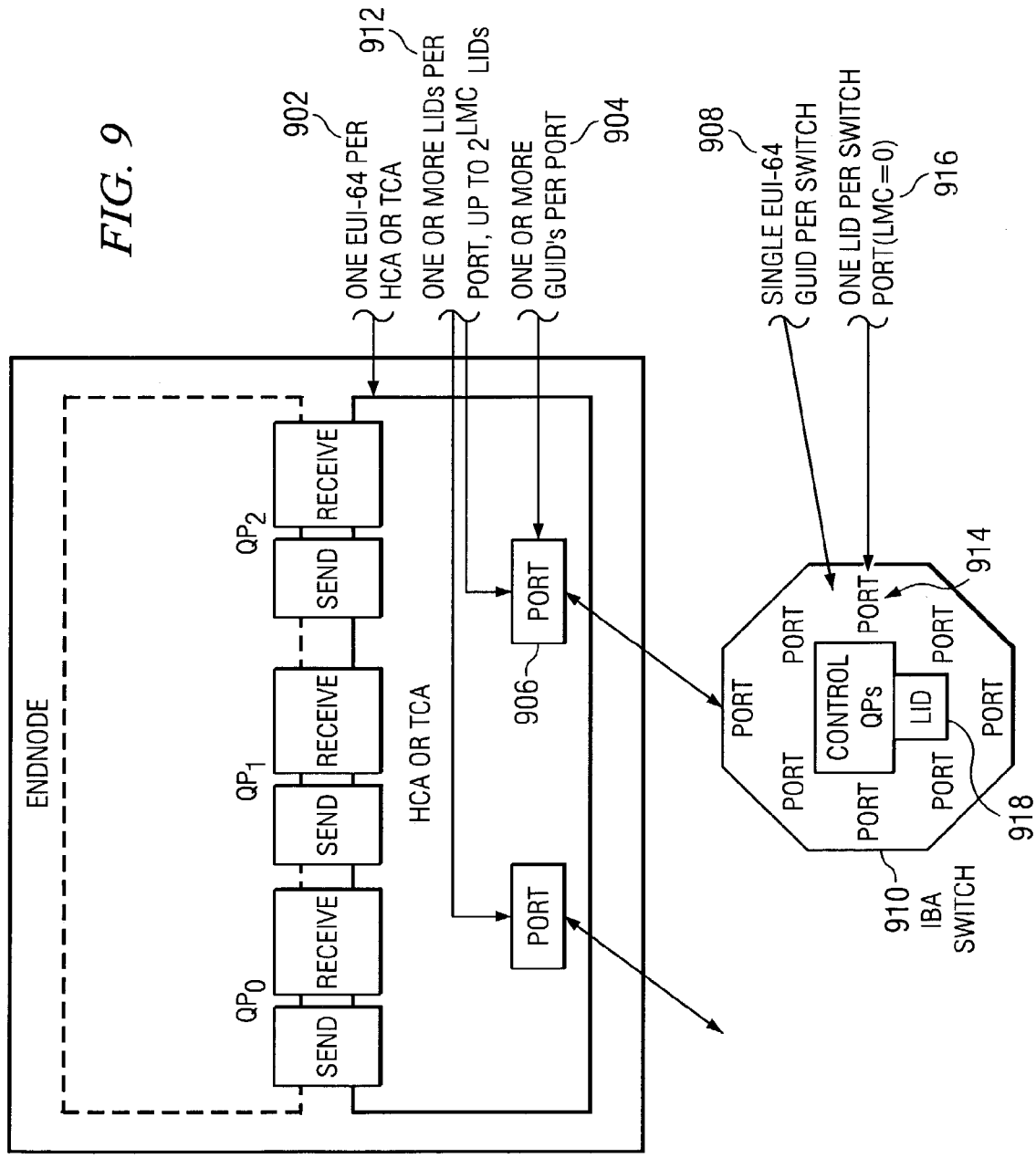
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs.

A single IEEE assigned 64-bit identifier (EUI-64) 902 is assigned to each component. A component can be a switch, router, or CA.

One or more globally unique ID (GUID) identifiers 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes. One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 906 has up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. Each switch 910 has one LID 918 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
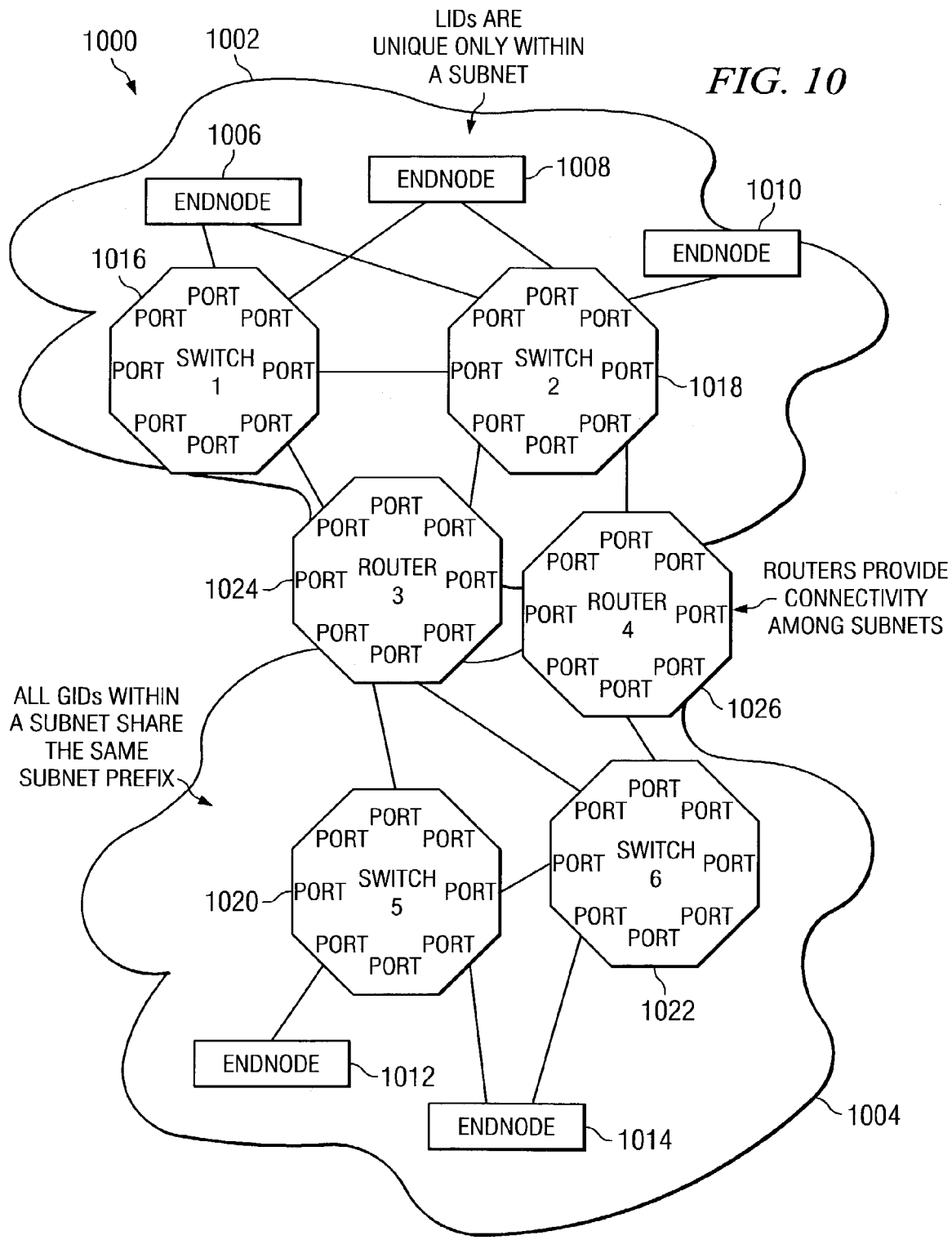
FIG. 10 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022.

Routers connect subnets. For example, subnet 1002 is connected to subnet 1004 with routers 1024 and 1026. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one, embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of endnodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch.

Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port. A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 11:
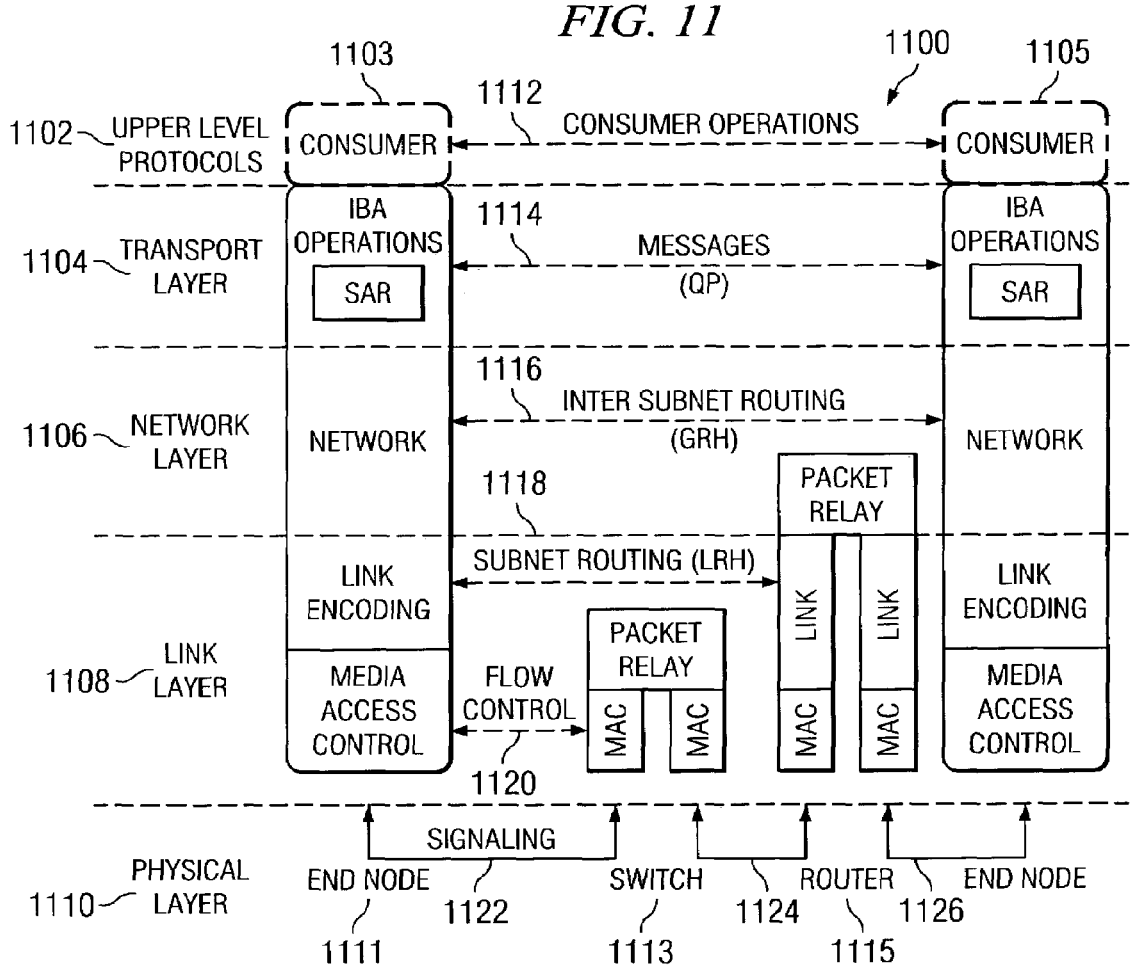
FIG. 11 is a diagram of a layered communication architecture used in a preferred embodiment of the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adaptor endnode protocol layers (employed by endnode 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs (1112) to create messages at transport layer 1104. Transport layer 1104 passes messages (1114) to network layer 1106. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between endnodes. Transport layer 1104 provides end-to-end message movement. In one embodiment, the transport layer provides three types of transport services as described above which are reliable connection service; reliable datagram service; and unreliable datagram service. Network layer 1106 performs packet routing through a subnet or multiple subnets to destination endnodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

As previously mentioned, the present invention is directed to an improved apparatus, system and method for use with a system area network, such as an InfiniBand network, in which logical partitioning is supported by host channel adapters (HCAs) of the system area network. With the logical partitioning support for HCAs provided by the present invention, multiple operating systems may share the resources of a single physical HCA. Logical partitioning ensures that each operating system is unaware that the HCA hardware resources are being shared with other operating systems and further guarantees that the individual operating systems and applications of a particular partition are prevented from accessing HCA hardware resources which are associated with other partitions.

Figure 12:
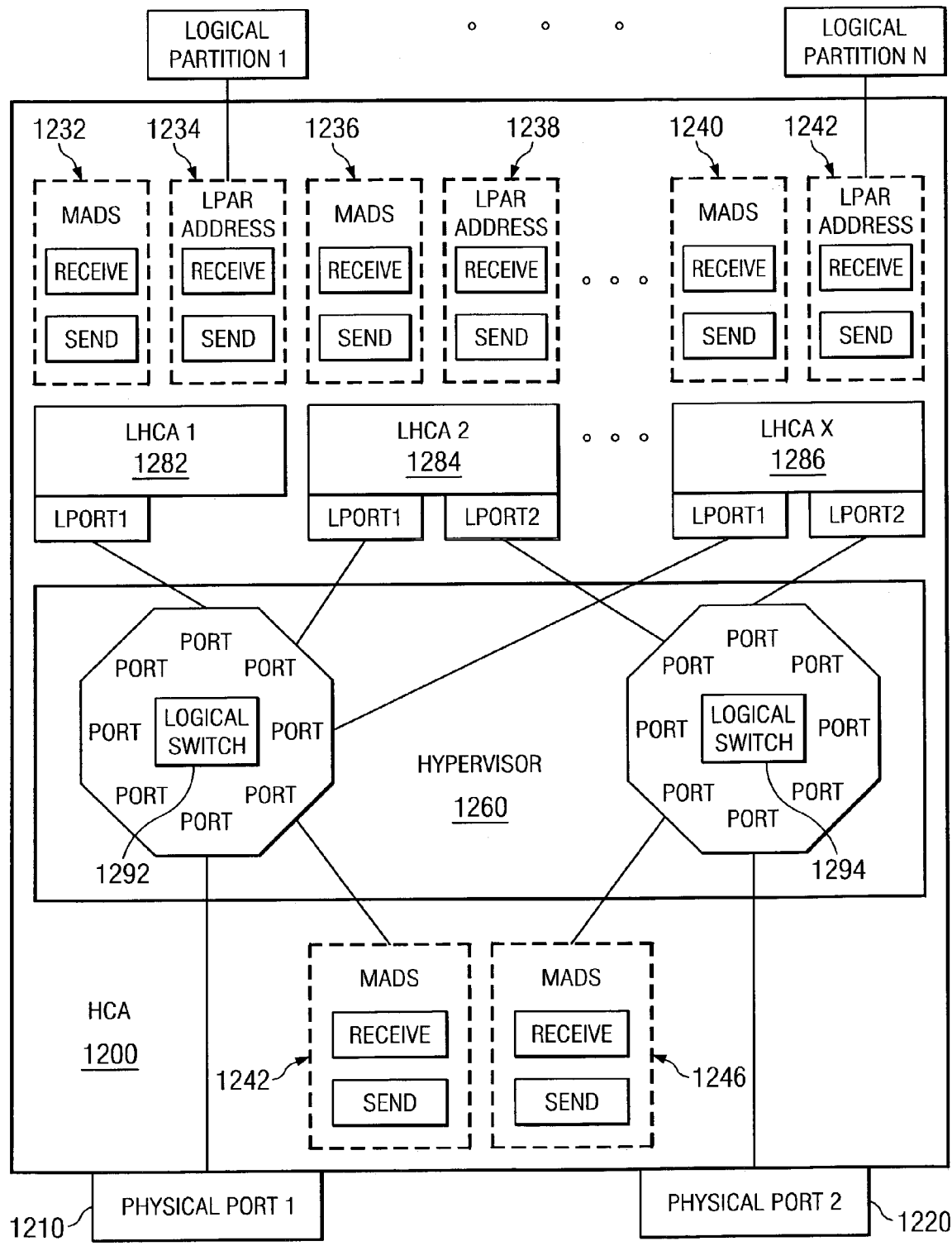
FIG. 12 is an exemplary block diagram of a host channel adapter in which logical entities within the host channel adapter are illustrated.

FIG. 12 is an exemplary diagram of a physical host channel adapter illustrating the logical elements supported by the physical host channel adapter. The host channel adapter shown in FIG. 12 corresponds to the host channel adapter illustrated in FIG. 3A but with the enhancements of the present invention to provide for logical partition support within the host channel adapter.

As shown in FIG. 12, the host channel adapter (HCA) 1200 includes two physical ports 1210 and 1220 similar to the host channel adapter shown in FIG. 3A. In addition, queue pairs 1232-1242 are provided on the HCA 1200 for the sending of data packets to, and receiving data packets from, host system resources. Additional facilities are provided which permit the logical switches and logical HCAs to appear as normal switches and HCAs to an external Subnet Manager.

Resources of the host system are logically partitioned into logical partitions LPAR1 through LPARn in a manner generally known in the art. In order for each LPAR to have an architecturally accurate view of the host channel adapter, the hypervisor creates the image of a logical host channel adapter which is dedicated to a single LPAR. The logical host channel adapter is configured to possess one or more logical ports which are attached to a logical switch that in turn is connected to the physical port of the physical host channel adapter.

The hypervisor creates a logical HCA port by requesting a unique LID and GID from the subnet manager. If a logical switch is to be created, the hypervisor requests a LID from the subnet manager to be used by the logical switch for all of its logical ports. The number of logical HCAs and logical switches that the hypervisor can create is dependent upon the system design, and is limited only by the total number of available LID values that can exist on an Infiniband subnet, e.g., 16K.

When the hypervisor receives the requested LIDs for from the subnet manager, it configures the physical port facilities to indicate the LID values which are internal versus external to the physical HCA. The LID values which are internal to the physical HCA include the LIDs which the hypervisor acquired from the subnet manager. This step of configuring the port facilities with the internal LID values provides the effect of creating the routing tables associated with the logical switches. Only the hypervisor is given access to these port facilities.

When an operating system desires to communicate via queue pairs through the system area network (SAN), it must first request access to an HCA. If the hypervisor has previously acquired a LID and GID for the logical HCA, the hypervisor responds to the operating system's request with a unique HCA identifier. The operating system uses this HCA identifier for all subsequent requests associated with that HCA. The operating system cannot distinguish whether the HCA identifier is associated with a logical or physical HCA.

Once the operating system has obtained an HCA identifier, it then requests access to one or more queue pairs for use by the LPAR associated with the operating system. The operating system's request for a queue pair includes the HCA identifier as well as various attributes for the queue pair (including the type of service, maximum transfer length, etc.). The hypervisor selects an unused queue pair and uses the HCA identifier contained in the operating system's request to determine the LID and GID to be used to configure the queue pair facilities. Only the hypervisor is given access to these queue pair facilities. When the hypervisor has completed the configuration of the queue pair facilities with the LID, CID, and the specific attributes contained in the operating system's request, it responds to the operating system's request with the queue pair number for use by the operating system.

For example, when an operating system of a logical partition requests the usage of an additional queue pair, the hypervisor selects a queue pair which is not currently assigned to any logical partition, and assigns values to the queue pair's LID, GID, and physical port identifiers which correspond to the logical HCA of the requesting logical partition. In this way, only the hypervisor (which is trusted software that may access any HCA resource), the operating system, and user applications associated with the logical partition of the operating system may access the queue pair. Furthermore, the operating system and applications of the logical partition view the system as being dedicated to that operating system and applications and do not have knowledge of the other logical partitions.

Queue pairs having the same LID, GID, and physical port association comprise a logical partition of the HCA. The concept used in logical partitioning gives each operating system the view that they are operating in their own address space.

Each logical partition has its own address space to prevent access to the hardware resources of the logical partition by unauthorized software. Only the hypervisor, which is trusted code and has the highest privileges for accessing hardware resources, the operating system of the logical partition, and applications within the logical partition may access resources of the HCA that are assigned to the logical partition.

In order to direct incoming data packets to an appropriate logical partition in the HCA and to direct outgoing data packets to an appropriate physical port from logical partitions, each logical partition includes a logical HCA 1282-1286 with logical ports, logical switches 1292-1294 associated with physical ports 1210-1220, and a logical switch control point within the subnet management agent 1250. The subnet manager is capable of assigning unique logical identifiers (LIDs) and global identifiers (GIDs) to the logical HCA ports, and the hypervisor updates queue pair facilities to associate each queue pair with a LID and GID. The hypervisor 1260 maintains one or more tables that identify the unique LIDs, GIDs, and physical port numbers for the resources of each logical partition.

In other words, each logical port has an associated LID/GID. The logical port belongs to a logical host channel adapter that has been assigned to a logical partition. The queue pairs 1232-1242 are associated with particular logical ports. In this way, each logical partition operates as if it had its own logical host channel adapter 1282-1286.

Each logical host channel adapter 1282-1286 may have a plurality of queue pairs 1232-1242 assigned to a logical partition which have attributes that are configured to provide access to multiple physical ports 1210-1220. Since each queue pair 1232-1242 may send data packets to and receive packets from a plurality of physical ports 1210-1220, each queue pair 1232-1242 provides facilities which indicate the physical port to which it is associated.

Each physical port 1210-1220 also provides additional facilities which are used to control whether packets to a particular Destination LID are routed out the physical port 1292-1294 or to a queue pair contained within the HCA 1200. That is, the HCA hardware uses the port facilities to check whether inbound packets should be directed to a particular queue pair 1232. HCA hardware also uses the port facilities to check outbound packets to determine whether the destination is another queue pair 1232-1242 within the physical HCA 1200, in which case the packet is routed to the internal queue pair 1232-1242. The HCA hardware performs this check by looking at the destination logical identifier (DLID) to see if the DLID is assigned to a logical port defined on a logical host channel adapter 1282-1286 that is supported by this physical host channel adapter 1200. These internally routed packets are also checked to ensure they also meet the destination queue pair's attributes. Both the queue pair facilities and the port facilities are maintained by the hypervisor software and create the logical view that a switch exists between the queue pair and the physical port.

The operating systems and applications of one logical partition may communicate with the operating system and applications of another logical partition or with external devices via normal InfiniBand protocols. The OS and applications are unable to distinguish whether the communication endpoint is internal or external to the physical HCA, since the logical HCAs and logical switches operate identically to physical HCAs and physical switches.

Figure 13:
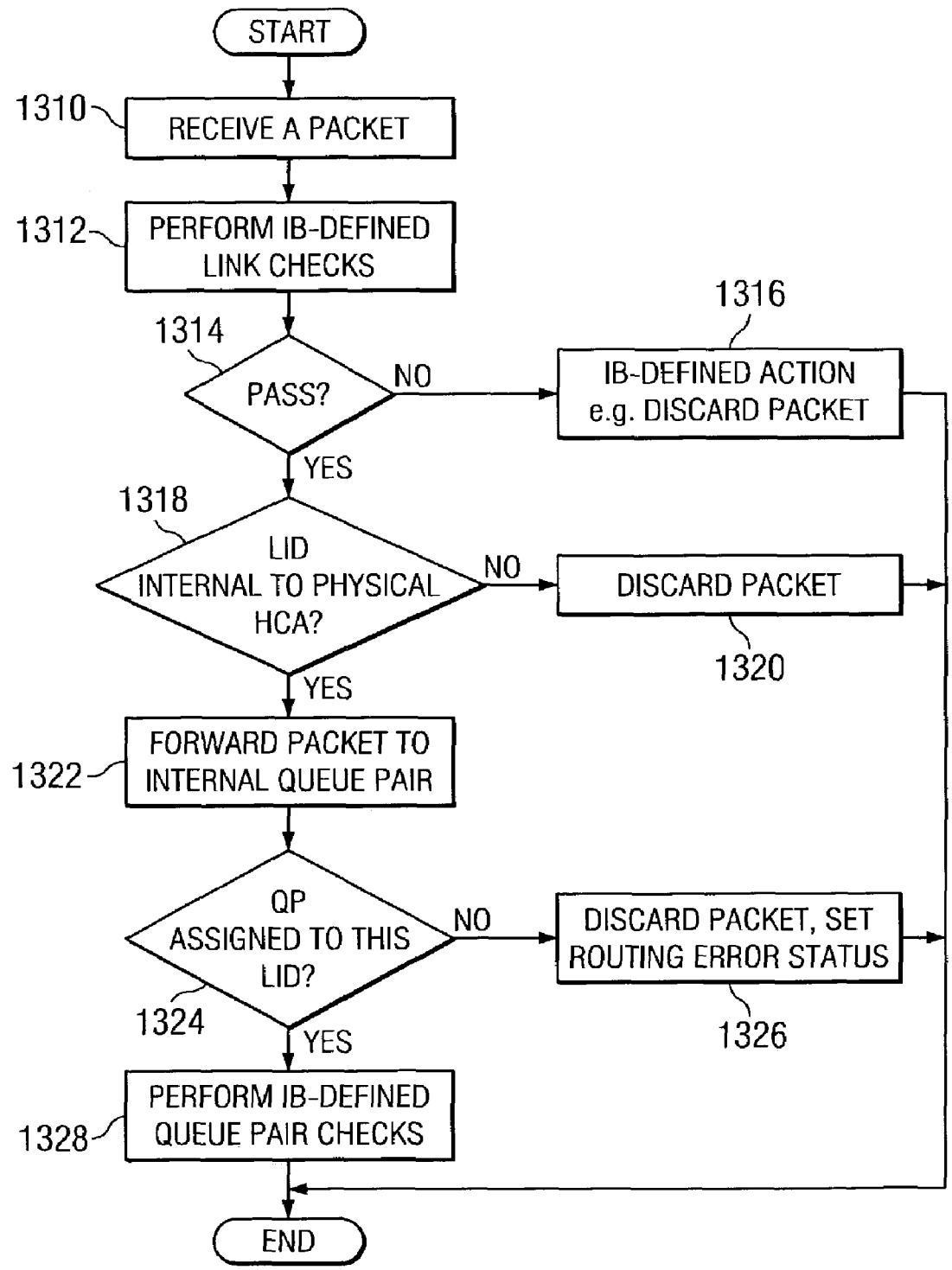
FIG. 13 illustrates a flowchart outlining an exemplary operation of the present invention when processing a received data packet according to the present invention.

FIG. 13 illustrates a flowchart outlining an exemplary operation by which received data packets are processed by the present invention. As shown in FIG. 13, the operation starts with a data packet being received (step 1310). InfiniBand protocol defined link checks are performed (step 1312) and a determination is made as to whether the data packet passes the link checks (step 1314). If not, an InfiniBand protocol defined action is performed (step 1316), e.g., the packet is discarded, and the operation ends.

If the data packet passes the link checks (step 1314), then the packet's LID is checked to determine whether it is contained within the physical HCA (step 1318). If the packet is not contained within the physical HCA, the packet is discarded (step 1320). Otherwise, the packet is forwarded to the Queue Pair (step 1322), where the packet is checked to determine that the DLID of the packet matches the LID contained within the QP facilities (step 1324).

If this check fails, the packet is discarded and error status indicating a Routing Error is logged (step 1326). If this check passes, then standard InfiniBand protocol defined transport checks are performed on the data packet (step 1328). It should be noted that steps 1318-1326 duplicate the behavior of a physical switch without the physical switch facilities. Thus, the present invention provides the notion of a logical switch in the InfiniBand architecture.

Figure 14:
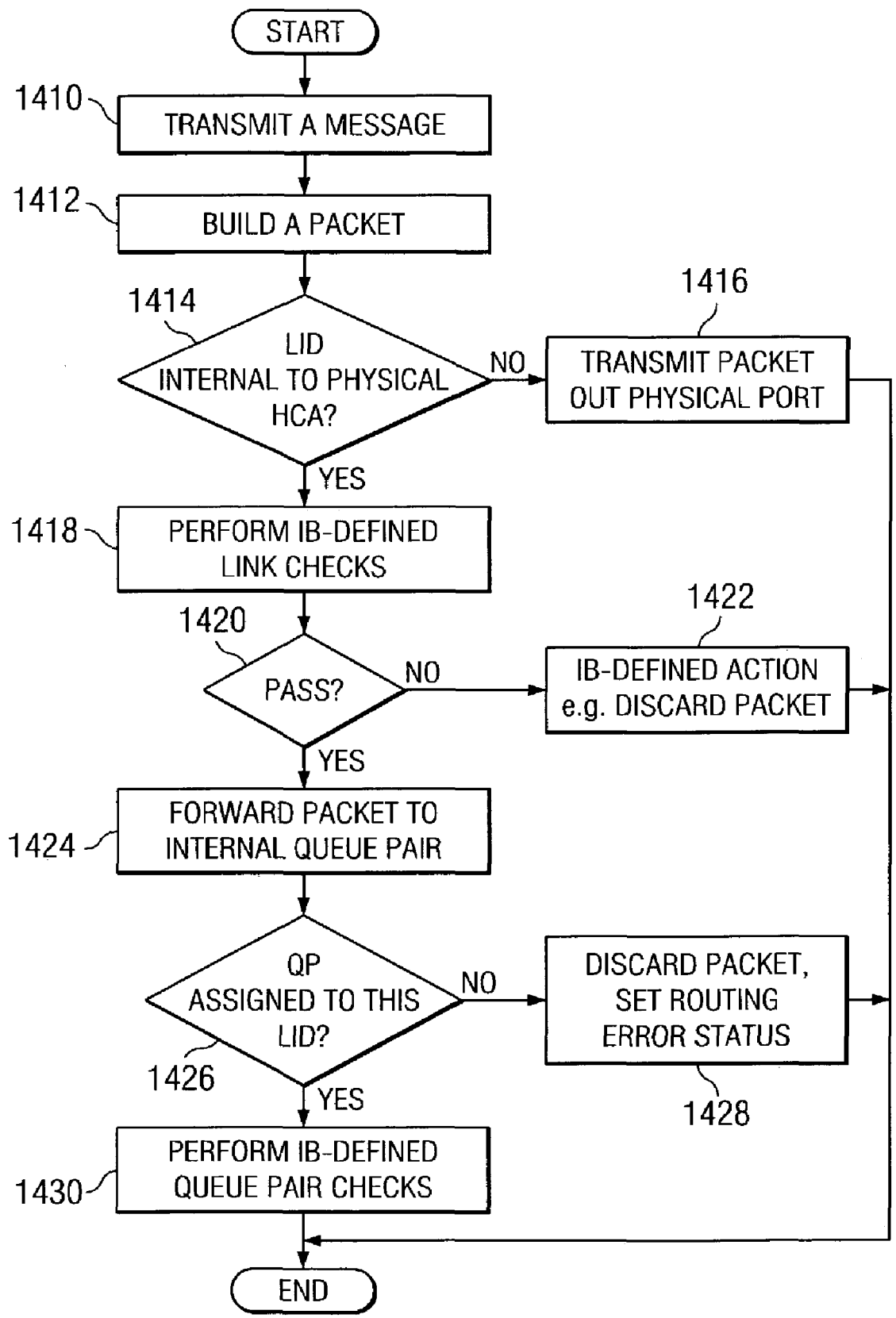
FIG. 14 illustrates a flowchart outlining an exemplary operation for transmitting a message according to the present invention.

FIG. 14 illustrates a flowchart outlining an exemplary operation by which a message is transmitted by the present invention. As shown in FIG. 14, the operation starts with an instruction to transmit a message (step 1410). The operation continues with the building of a transmit packet (step 1412). The packet's LID is checked to determine whether it is contained within the physical HCA (step 1414). If the packet is not contained within the physical HCA, the packet is transmitted out the physical port defined within the Queue Pair facilities (step 1416). Otherwise, Infiniband protocol defined link checks are performed (step 1418), and a determination is made as to whether the data packet passes the link checks (step 1420). If not, and Infiniband protocol defined action is performed (step 1422), e.g., the packet is discarded and the operation ends.

If the data packet passes the link checks, then the packet is forwarded to the Queue Pair (step 1424), where the packet is checked to determine that the DLID of the packet matches the LID contained within the QP facilities (step 1426). If this check fails, the packet is discarded and error status indicating a Routing Error is logged (step 1428). If this check passes, then the Infiniband defined Queue Pair protocol checks are performed on the data packet (step 1430). It should be noted that steps 1414-1428 duplicate the behavior of a physical switch without the physical switch facilities, therefore the notion of a logical switch is introduced by this invention.

Thus, the present invention provides an apparatus, system and method for logically partitioning the resources in a host channel adapter of a system area network. The present invention provides mechanisms for assigning LIDs, GIDs, and physical port identifiers to queue pair facilities and for routing data packets to logical ports or physical ports based on port facilities which identify whether a specific LID is contained within the physical HCA. In this way, separate operating system environments are supported by the resources of a single HCA while each separate operating system environment is given the view of a dedicated HCA.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for logically partitioning resources of a host channel adapter for use in a system area network, comprising:
   assigning a first logical identifier to a first set of resources of the host channel adapter to thereby define a first logical partition;
   assigning a second logical identifier to a second set of resources of the host channel adapter to thereby define a second logical partition; and
   providing a logical switching mechanism for routing of a data packet to one of the first set of resources or the second set of resources based on a logical identifier associated with the data packet, wherein the logical switching mechanism includes queue pair facilities maintained by a hypervisor that identify a physical port to which each queue pair in the host channel adapter is associated, and wherein the logical switching mechanism further includes port facilities maintained by a hypervisor for routing of data packets to queue pairs within the host channel adapter or to physical ports of the host channel adapter, and wherein the port facilities operate to check inbound data packets sent to a particular queue pair to ensure that the inbound data packets meet attribute requirements of the particular queue pair, and wherein the port facilities check outbound data packets to determine whether the destination is another queue pair within the host channel adapter.

2. The method of claim 1, wherein the logical switching mechanism is a logical switch that routes data packets to logical ports associated with one of the first logical partition and the second logical partition.

3. The method of claim 1, wherein the resources of the host channel adapter includes a plurality of queue pairs.

4. The method of claim 3, wherein each queue pair in the plurality of queue pairs has an associated logical identifier and global identifier, and wherein the logical identifier and global identifier of a queue pair is set to a logical identifier and global identifier of a logical host channel adapter associated with a logical partition to which the queue pair is allocated.

5. The method of claim 4, wherein the logical switching mechanism routes the data packet by performing a lookup of a logical port based on one of a logical identifier and a global identifier in a header of the data packet.

6. The method of claim 4, wherein routing of a data packet to one of the first set of resources or the second set of resources based on a logical identifier associated with the data packet further includes:
   comparing the logical identifier associated with the data packet to a logical identifier associated with a physical port; and
   forwarding the data packet to a resource associated with the physical port if the logical identifier associated with the data packet matches the logical identifier associated with the physical port.

7. The method of claim 4, wherein the logical identifier and global identifier associated with each queue pair is assigned by a hypervisor.

8. An apparatus for logically partitioning resources of a host channel adapter for use in a system area network, comprising:
   means for assigning a first logical identifier to a first set of resources of the host channel adapter to thereby define a first logical partition;
   means for assigning a second logical identifier to a second set of resources of the host channel adapter to thereby define a second logical partition; and
   means for providing a logical switching mechanism for routing of a data packet to one of the first set of resources or the second set of resources based on a logical identifier associated with the data packet, wherein the logical switching mechanism includes queue pair facilities maintained by a hypervisor that identify a physical port to which each queue pair in the host channel adapter is associated, and wherein the logical switching mechanism further includes port facilities maintained by a hypervisor for routine of data packets to queue pairs within the host channel adapter or to physical ports of the host channel adapter, and wherein the port facilities operate to check inbound data packets sent to a particular queue pair to ensure that the inbound data packets meet attribute requirements of the particular queue pair, and wherein the port facilities check outbound data packets to determine whether the destination is another queue pair within the host channel adapter.

9. The apparatus of claim 8, wherein the logical switching mechanism is a logical switch that routes data packets to logical ports associated with one of the first logical partition and the second logical partition.

10. The apparatus of claim 8, wherein the resources of the host channel adapter includes a plurality of queue pairs.

11. The apparatus of claim 10, wherein each queue pair in the plurality of queue pairs has an associated logical identifier and global identifier, and wherein the logical identifier and global identifier of a queue pair is set to a logical identifier and global identifier of a logical host channel adapter associated with a logical partition to which the queue pair is allocated.

12. The apparatus of claim 11, wherein the logical switching mechanism routes the data packet by performing a lookup of a logical port based on one of a logical identifier and a global identifier in a header of the data packet.

13. The method of claim 11, wherein logical switching mechanism routes the data packet to one of the first set of resources or the second set of resources based on a logical identifier associated with the data packet by:
   comparing the logical identifier associated with the data packet to a logical identifier associated with a physical port; and
   forwarding the data packet to a resource associated with the physical port if the logical identifier associated with the data packet matches the logical identifier associated with the physical port.

14. The apparatus of claim 11, wherein the logical identifier and global identifier associated with each queue pair is assigned by a hypervisor.

15. A computer program product in a computer readable medium for logically partitioning resources of a host channel adapter for use in a system area network, comprising:
   first instructions for assigning a first logical identifier to a first set of resources of the host channel adapter to thereby define a first logical partition;
   second instructions for assigning a second logical identifier to a second set of resources of the host channel adapter to thereby define a second logical partition; and
   third instructions for providing a logical switching mechanism for routing of a data packet to one of the first set of resources or the second set of resources based on a logical identifier associated with the data packet, wherein the logical switching mechanism includes queue pair facilities maintained by a hypervisor that identify a physical port to which each queue pair in the host channel adapter is associated, and wherein the logical switching mechanism further includes port facilities maintained by a hypervisor for routing of data packets to queue pairs within the host channel adapter or to physical ports of the host channel adapter, and wherein the port facilities operate to check inbound data packets sent to a particular queue pair to ensure that the inbound data packets meet attribute requirements of the particular queue pair, and wherein the port facilities check outbound data packets to determine whether the destination is another queue pair within the host channel adapter.

16. The computer program product of claim 15, wherein the logical switching mechanism is a logical switch that routes data packets to logical ports associated with one of the first logical partition and the second logical partition.

17. The computer program product of claim 15, wherein the resources of the host channel adapter includes a plurality of queue pairs.

18. The computer program product of claim 17, wherein each queue pair in the plurality of queue pairs has an associated logical identifier and global identifier, and wherein the logical identifier and global identifier of a queue pair is set to a logical identifier and global identifier of a logical host channel adapter associated with a logical partition to which the queue pair is allocated.

19. The computer program product of claim 18, wherein the logical switching mechanism routes the data packet by performing a lookup of a logical port based on one of a logical identifier and a global identifier in a header of the data packet.

20. The computer program product of claim 18, wherein the logical switching mechanism routes the data packet to one of the first set of resources or the second set of resources based on a logical identifier associated with the data packet by:
   comparing the logical identifier associated with the data packet to a logical identifier associated with a physical port; and
   forwarding the data packet to a resource associated with the physical port if the logical identifier associated with the data packet matches the logical identifier associated with the physical port.

21. The computer program product of claim 18, wherein the logical identifier and global identifier associated with each queue pair is assigned by a hypervisor.

* * * * *